July 25, 1961  B. H. PARKS  2,993,660
FISHING REEL
Filed May 13, 1959  3 Sheets-Sheet 1

INVENTOR.
Bert H. Parks,
BY John Powers
ATTORNEY

July 25, 1961
B. H. PARKS
2,993,660
FISHING REEL
Filed May 13, 1959
3 Sheets-Sheet 2
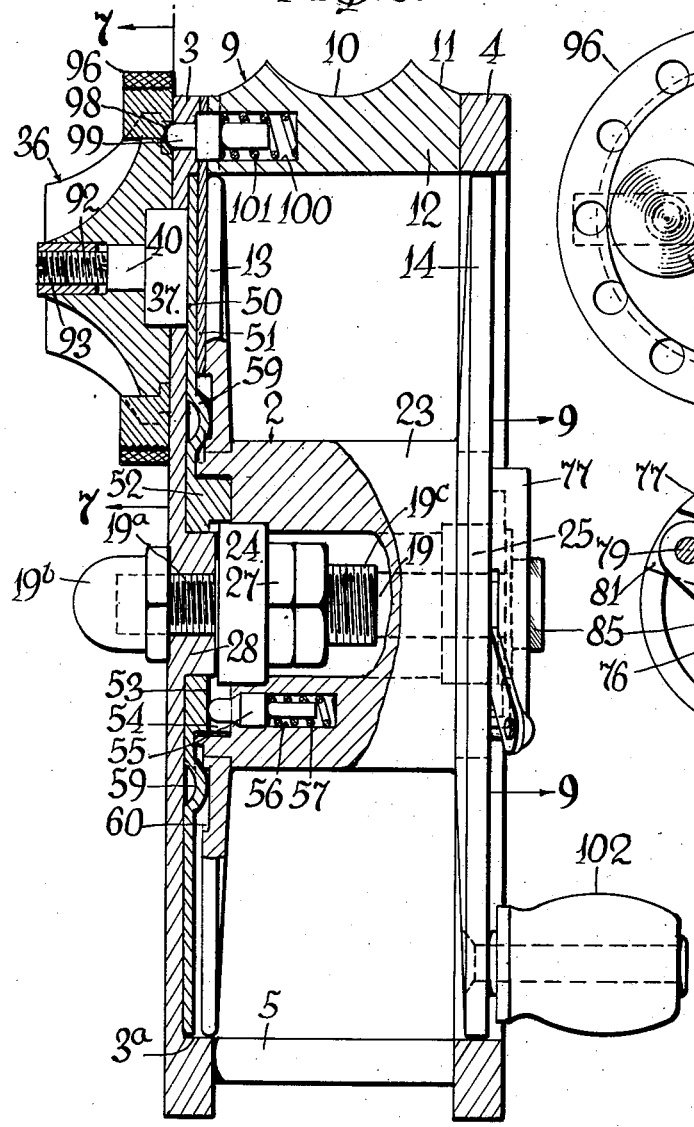
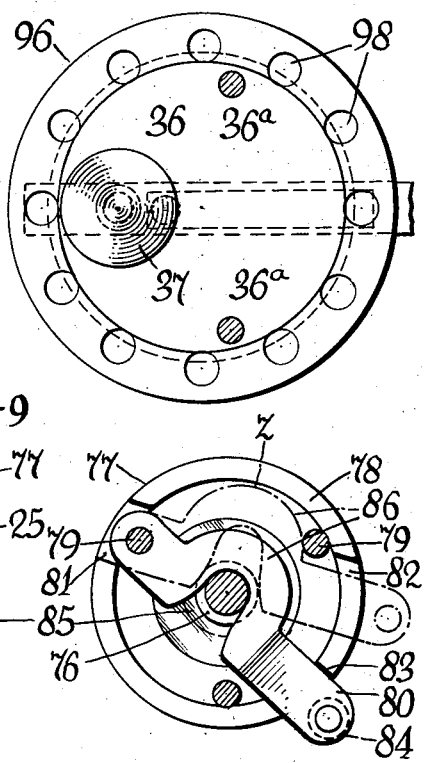
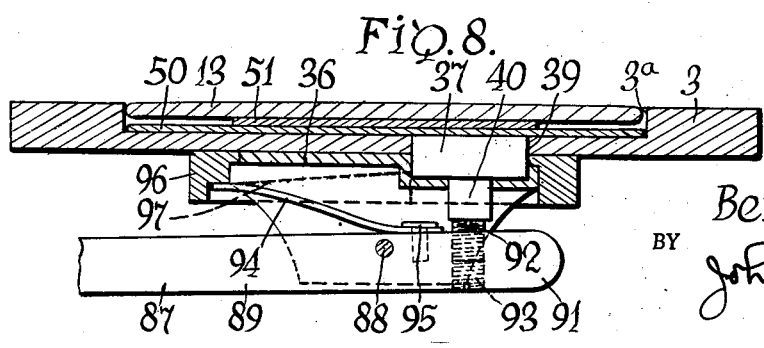
INVENTOR.
Bert H. Parks,
BY
John Bowen
ATTORNEY.

July 25, 1961   B. H. PARKS   2,993,660
FISHING REEL
Filed May 13, 1959   3 Sheets-Sheet 3
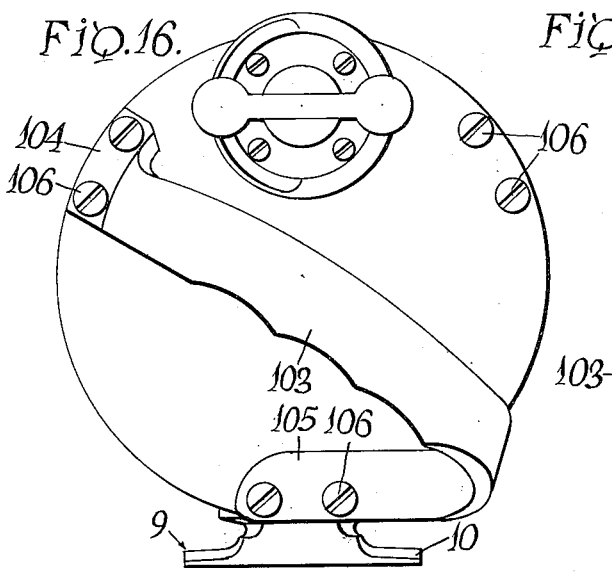
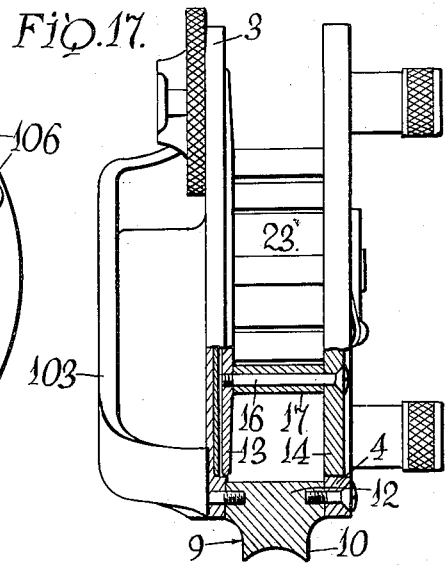
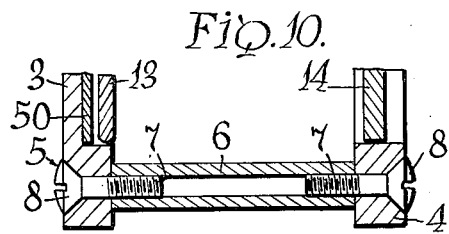
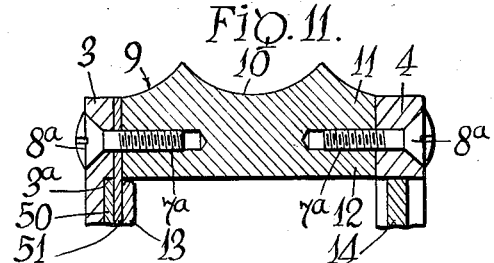
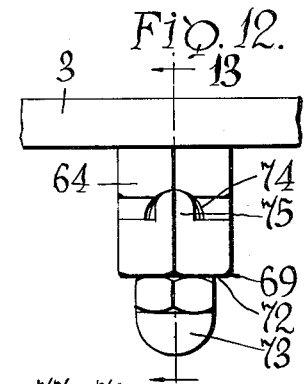
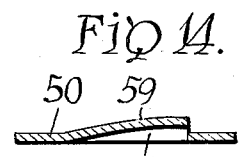
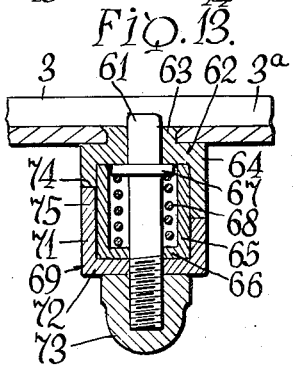
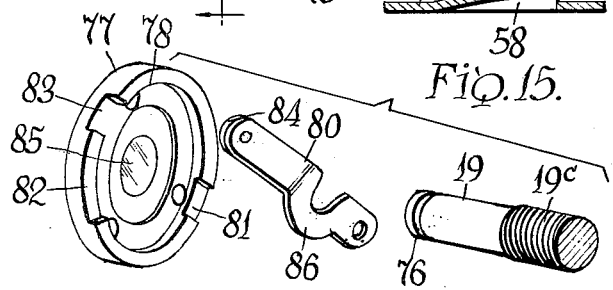
INVENTOR.
Bert H. Parks,
BY
John Lowers
ATTORNEY.

United States Patent Office 2,993,660
Patented July 25, 1961

2,993,660
FISHING REEL
Bert H. Parks, Grants Pass, Oreg.
(701 Grizzly Peak Blvd., Berkeley 8, Calif.)
Filed May 13, 1959, Ser. No. 813,009
14 Claims. (Cl. 242—84.51)

This invention relates to improvements in fishing reels and proposes improvements in a reel of the general type shown in my Patent 2,553,784 of May 22, 1951.

This type of reel includes a cage element consisting of a wall of disc form and a connected ring, the wall and the ring being in parallel planes, a reel element having connected walls in parallel planes and a centrally located sleeve extending between the walls, one wall of the reel element being adjacent the wall of the cage element and its other wall being arranged within the ring, a central arbor, ball bearings between the arbor and the sleeve of the reel element, provision for the removal of the reel element from the cage element to enable access to the ball bearings or the substitution of a similar reel element having a different size or type of line, and a brake feature having provision, including a spring element, for the selective application of various degrees of braking pressure to the reel element and provision, operable selectively, for enabling the reel element to run free.

The objects of the invention are (1) to provide for the application of braking pressure to the reel element while at the same time preventing lateral thrust upon the reel element as a consequence of the braking pressure; (2) to provide facility, optimum in respect to ease and time, in the regulation of the tension of the spring element of the brake feature; (3) to provide for the rotation with the reel of a "floating" disc to which the braking pressure is directly applied when the line is payed out as in casting or when a fish takes the lure and for the positional stability of such disc when the line is reeled in; (4) to provide for optimum speed and facility in the removal of the reel from the cage and in its replacement; (5) to provide for optimum facility in the regulation of the degree of the braking pressure or in the release of the braking pressure; and (6) to provide for the ready and economical conversion of the reel for use by either a right-handed or left-handed individual.

The reel of the invention may be made in larger and smaller sizes, the reels of smaller size being recommended for casing or trolling and the reels of larger size being recommended where large game fish are sought by trolling.

In the drawings:

FIGURE 6 is a central vertical section on the line 6—6 of FIGURE 1, looking in the direction of the arrows.

FIGURE 7 is an elevation of the braking feature, looking at the inner side of the ring by which the tension of the spring is regulated.

FIGURE 8 is a detail horizontal sectional view on a somewhat enlarged scale along the line 8—8 of FIGURE 1, looking in the direction of the arrows.

FIGURE 9 is a detail view partly in elevation and partly in section, the section being taken along the line 9—9 of FIGURE 6 looking in the direction of the arrows, and the view showing the features which provide for the removal and replacement of the reel relatively to the cage.

FIGURE 10 is a detail sectional view showing one of the several fastenings used in the connection of the wall and ring of the cage element, FIGURE 11 is a detail cross-sectional view on the line 11—11 of FIGURE 1 showing the connection of the reel mounting element to the wall and ring of the cage element.

FIGURE 12 is a side elevation of the click feature which is carried by the wall of the cage element.

FIGURE 13 is a detail sectional view on the line 13—13 of FIGURE 12, looking in the direction of the arrows.

FIGURE 14 is a detail sectional view on the line 14—14 of FIGURE 3, looking in the direction of the arrows.

FIGURE 15 is an exploded perspective view showing the several parts of the reel element latching feature.

FIGURES 16 and 17 show a reel of larger size.

FIGURE 16 is a side elevation, viewed at the side at which the cage wall is located.

FIGURE 17 is an elevation, with parts shown in section, wherein the cage wall and the connected ring are viewed peripherally.

Figure 1:
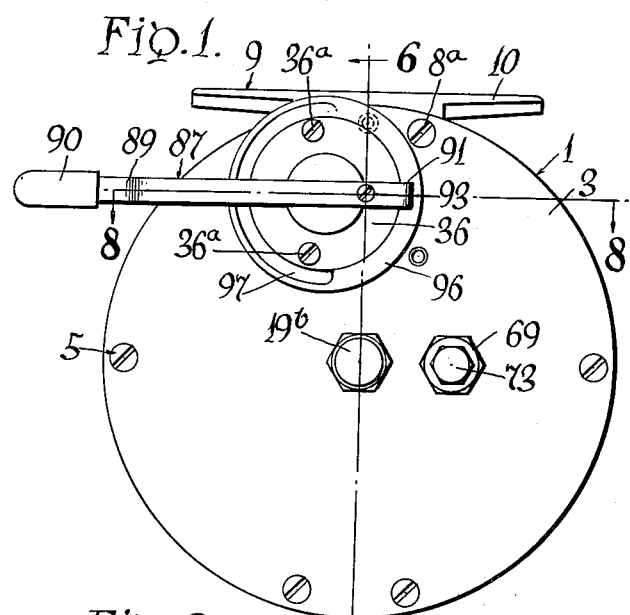
FIGURE 1 is a side elevation of a reel of smaller size, viewed at the side at which the cage wall is located.

The reel includes cage and reel elements designated generally as 1 and 2 respectively.

The cage element includes a wall 3 and a ring 4 suitably spaced and in parallel planes. The wall 3 and ring 4 are at once connected and held properly spaced by a suitable number of fastenings 5 which preferably consist of transversely arranged bars 6, the ends of which abut the inner faces of the wall 3 and ring 4 and are formed with centrally located openings terminating in threaded end portions 7, and screws 8, the heads of which engage against the outer faces of the wall 3 and ring 4 and the shanks of which extend through openings in said wall and ring respectively and are threaded for engagement in the portions 7. Obviously by threading the screws 8 into the portions 7 to the required extent the wall 3 and ring 4 are rigidly connected and maintained in parallel planes and in properly spaced relation.

The reel mounting element 9 which serves for the connection of the reel to the rod (not shown) is connected to the cage element and is also utilized for the connection of the wall 3 and ring 4 in the manner described. Thus the reel mounting element 9 includes a rod engaging shoe 10 and a centrally located body portion 11 which terminates in a head 12, the transverse dimension of which conforms to the spacing of the wall 3 and ring 4. The head 12 fits between the wall 3 and ring 4 and its sides abut the inner faces of said wall and ring. The head 12 is formed with recesses 7a which are counterparts of the threaded portions 7 and is connected to the wall 3 and ring 4 by screws 8a which are counterparts of the screws 8. The head 12 of the shoe is the functional equivalent of a pair of fastenings 5 and at each of its sides is connected by screws 8a to the wall 3 and ring 4 respectively.

The reel element 2 includes connected walls 13 and 14 suitably spaced in parallel planes. The wall 13 is adjacent the cage wall 3 which preferably has a recess 3a within which the wall 13 is arranged. The wall 14 is arranged within the inner circumferential face of the ring 4. The walls 13 and 14 carry a centrally located sleeve 23 upon which the line is wound. A centrally located transverse arbor 19 extends through the sleeve 23. The arbor is preferably carried by the cage wall 3 and has a threaded portion 19a which is tapped through an opening in the wall 3, a securing nut 19b being fitted upon the projecting end portion of the arbor and serving for the attachment of the arbor to the wall 3. At its opposite end the arbor extends through an opening in the wall 14 of the reel element and has a projecting end portion for cooperation with elements (later to be described in detail) by means of which the reel element is confined within the cage element.

The arbor 19 and sleeve 23 cooperate in the support of ball bearings 24 and 25 located adjacent the cage wall 3 and reel wall 14 respectively. The outer rings of the ball bearings fit within the end portions of the sleeve 23 with such closeness that in the use of the reel they rotate with said sleeve. The arbor 19 is formed with reduced end portions upon which the inner rings of the ball bearings are fitted, these remaining stationary during the operation of the reel. The ball bearing 24 is confined between a collar 27 upon the arbor 19 and a central tubular boss 28 formed upon and projecting inward from the cage wall 3. The collar 27 may be constituted by a nut which is mounted upon a threaded portion 19c of the arbor.

In the reel of larger size as shown in FIGURES 16 and 17 the walls 13 and 14 of the reel element, in addition to their connection by the sleeve 23, are preferably also connected by bolts 16 provided in any suitable number and which carry spacing sleeves 17, the ends of which abut the inner faces of the walls 13 and 14.

According to the invention a floating disc 50 adjoins the cage wall 3 and is fitted in the recess 3a with which it is diametrically co-extensive, the disc 50 being arranged between the cage wall 3 and the wall 13 of the reel element. The disc 50 is adjacent the edge face of the sleeve 23 and is confined in the recess 3a by a retaining element in the form of a plate 51, which has an area substantially less than the area of the disc and having openings for the screws 8a by which it is clamped between the head 12 and the portion of the wall 3 which extends beyond the recess 3a, the plate 51 being positioned between the disc 50 and the wall 3.

Figure 5:
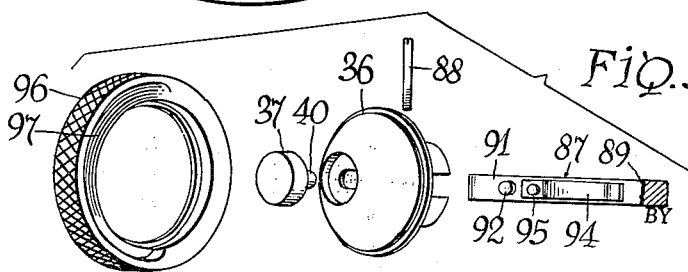
FIGURE 5 is an exploded perspective view showing the several parts which constitute the brake feature.

The pressure for braking the movement of the reel element is applied directly to the disc 50 in an off center area, the braking feature being similar to that shown in my patent and including a shoe 37 which with braking effect engages the adjacent face of the floating disc 50. The shoe 37 is laterally movable through an opening 39 in the cage wall 3 and is provided with an outwardly projecting stud 40 which extends into an opening in a bracket 36 attached by screws 36a to the cage wall 3. If desired the shoe 37 may be provided with a projecting body of friction material as shown in FIGURE 5 of my Patent 2,553,784. As shown in FIGURES 6 and 8 the shoe 37 is preferably located within the area bounded by the edges of the retaining plate 51 whereby in the application of braking pressure the shoe 37 and the plate 51 bear upon the opposite sides of the floating disc 60 in coincident areas.

Figure 4:
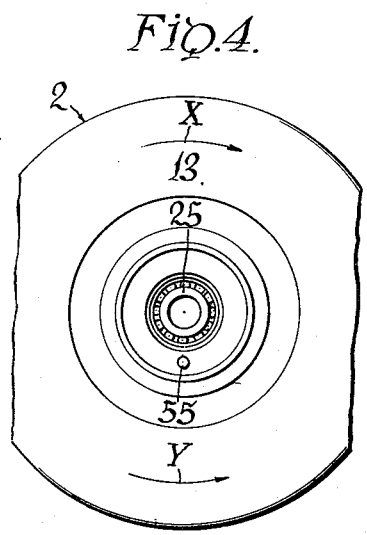
FIGURE 4 is an elevational view of the reel element, this figure assuming the removal of the reel element and the view being directed toward the side which adjoins the floating disc.
Figure 2:
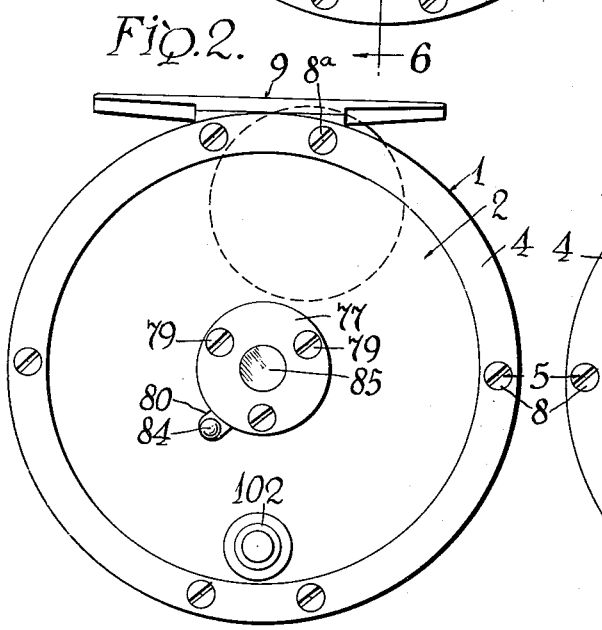
FIGURE 2 is a side elevation, viewed at the opposite side.

With reference to FIGURE 4 of the drawing it may be assumed that when the line is payed out as in casting, or when a fish takes the lure, the reel element, when the reel is used by a right-handed fisherman, has clockwise rotation as indicated by the arrow X. The disc 50 moves with the reel in its clockwise rotation. For this purpose the disc 50 has a hub portion 52 concentric to the arbor 19 which is accommodated in an annular recess formed in the adjacent end of the sleeve 23 and is rotatably mounted upon the boss 28 of the cage wall 3, the ball bearing 24 being positioned between the boss 28 and the collar 27. The face of the hub portion 52 which extends between its circumferential faces is formed with a series of arcuate cam faces 53 which are provided in a suitable number in accordance with the size of the reel. Four cam faces 53 are shown, it being understood that a greater or less number may be provided. The cam faces extend in the same direction and each cam face has an arcuate rise away from the disc 50 to an abrupt laterally directed shoulder 54. The operative connection between the reel element and the disc 50 to effect its rotation with the reel element includes any of the shoulders 54 and a pin 55 having lateral movement in a recess 56 formed in the sleeve 23, the pin 55 being biased by a spring 57 to a position in which it will engage an adjacent shoulder 54 to cause the disc 50 to rotate with the reel element. By virtue of such operative connection the braking pressure of the shoe 37 directly upon the disc 50 is effective to control the action of the reel while at the same time the braking function is served without the exercise of lateral thrust upon the reel. When the reel is used by a right-handed fisherman the reel element is moved counter-clockwise (as indicated by the arrow Y in FIGURE 4) to wind the line and pull in the fish the disc 50 remains stationary, the pin 55 riding idly over the cam faces 53 and the pin 61 by its bearing upon the plate 50 serving to hold the plate against any loose movement in its plane.

When the reel is used by a left-handed fisherman the reel element has counter-clockwise rotation (arrow Y) in paying out the line, the disc 50 rotating with the reel element, and has clockwise rotation (arrow X) in reeling in the line, the disc 50 remaining stationary.

Figure 3:
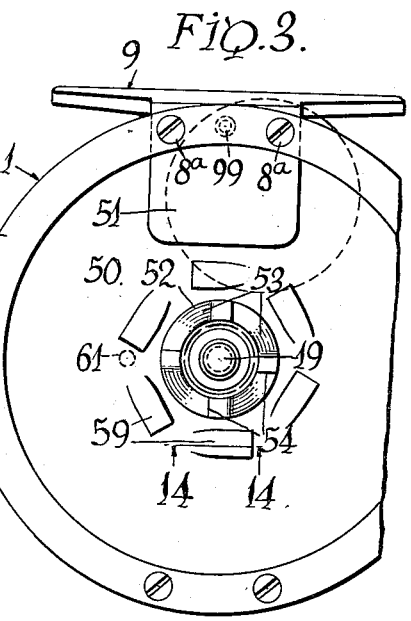
FIGURE 3 is a fragmentary side elevation of the cage element per se, looking toward the floating disc, this figure assuming the removal of the reel element from the cage element.

According to the invention the disc 50 is utilized to provide parts of the click feature. These parts (FIGURES 3 and 14) are cams 58 confronting the wall of the cage element and provided by upset channels 59 arranged in annular series concentric to the cams 53, the channels extending in a direction opposite the direction in which the cams 53 extend. The cams 58 have their inclinations reverse to the inclinations of the cams 53, that is to say, inward from their deep ends toward the disc 50. The reel wall 13 is formed with an annular recess 60 to accommodate the channels 59.

The click feature (FIGURES 1, 12 and 13) includes a spring loaded pin 61 carried by the wall 3 of the cage element and movable laterally through an opening in the cage element for engagement with the cams 58. When the fish takes the lure and runs with it the reel element rotates to pay out the line. In such rotation the pin 61 rides along the cams 58 and the surfaces of the disc 50 between the cams, the pin 61 being moved laterally outward by the cams. As each channel 59 comes into registry with the pin 61 the pin is snapped inward by its loading spring from the surface of the disc 50 to the outer end of the adjacent cam 58, such action resulting in a clicking noise. In the consequent rotation of the reel element a rapid succession of such clicking noises results and the fisherman is alerted.

The pin 61 is mounted in a casing 62 carried by and projecting outward from the wall 3 of the cage element. The casing 62 includes a base 63 secured to the wall 3 rivet-wise and beyond the wall 3 having an annular apron 64. The casing 62 is completed by a cylindrical shell 65 press fitted within the apron 64 and having an end wall 66. The base 63 and the wall 66 are formed with openings through which the pin 61 extends in slidable relation. Within the shell 65 the pin 61 carries a rigidly attached collar 67. The loading spring 68 reacts against the collar 67 and the end wall 66 of the shell and effects the inward movement of the pin. Beyond the shell 65 the pin 61 has a threaded terminal portion upon which a cap 69 is mounted, the cap being slidable relatively to the shell 64 and having an annular wall 71 which surrounds the shell and an end wall 72 adjacent the end wall 66 of the shell. The threaded terminal portion of the pin 61 extends beyond the wall 66 and carries a lock nut 73. The edge faces of the cap wall 71 and the apron 64 are in confronting relation. The apron 64 is formed with a recess 74 and the cap wall 71 is formed with a tongue 75 which, under the action of the spring 68, normally engages in the recess 74 to hold the cap against rotation. In this relation of the parts the pin 61 is positioned for engagement in the channels 59 with resultant clicking noise in the manner above described. In casting it is desirable that the click feature be inoperative, thereby to enable the floating disc to run free. For this purpose the cap 69 is pulled outward to disengage its tongue 75 from the recess 74 and is then turned to an extent such that the tongue 75 will ride upon the edge face of the apron 64, the pin 61 thereby being withdrawn to an inoperative position in which its engaging end is located inward of the inner face of the wall 3, the edge face of the apron by its engagement with the tongue 75 holding the pin in such inoperative position. When the cast has been completed the cap 69 is turned in the reverse direction until the tongue 75 registers with the recess 74 at which time the spring 68 returns the pin 61 to its operative position in which it bears against the disc 50.

The invention utilizes the arbor 19 for securing the reel element within the cage element and includes means of novel construction (FIGURES 2, 6, 9 and 15) which is operable to effect the quick and facile release of the reel element when its removal may be required and its equally quick and facile replacement and securement. The arbor 19 is of a length to extend beyond the reel wall 14 and its projecting end portion is formed with an annular groove 76. The projecting end of the arbor is enclosed in a cap 77 having an annular wall 78 which adjoins the reel wall 14, the cap 77 being secured to the wall 14 by screws 79, one of which serves as a pivot for a latch member 80 adjoining the wall 14 and the wall 78 having a marginal recess 81 to accommodate the pivoted end of the member 80. The wall 78 is also formed with marginal recesses 82 and 83, the recess 83 which is at one end of the recess 82 being of suitably greater depth. The recesses 82 and 83 accommodate the free end of the member 80 which, projecting beyond the wall 78, is provided with a finger piece 84. The extremity of the arbor 19 is accommodated in a central piece 85 which is preferably of plastic material and is carried by the cap 77. The member 80 is formed with a bow portion 86 which, in the securement of the reel element, engages in the groove 76 of the arbor 19. The member 80 is resilient and tends to spring away from the wall 14. When the reel is in use the free end portion of the member 80 by virtue of its resilience is within the recess 83 of the wall 78 at which time the bow portion 86 is engaged in the groove 76, the reel element thereby being latched in operative position. When the removal of the reel element from the cage element is required, the free end portion of the member 80 is depressed into alinement with the recess 82 whereupon the member 80 is moved through the recess 82 from its normal position as shown in full lines in FIGURE 9 to an inoperative position Z as shown by dot and dash lines at which time the bow portion 86 is disengaged from the groove 76, thereby to uncouple the reel element from the arbor 19 and to permit its free removal from the cage element. In the replacement of the reel element the member 80 initially remains in its position Z and when the reel element has been fitted within the cage element the member 80 is moved to its normal position, its free end springing into the recess 83 and latching the reel element in operative position. It is manifest that the removal or replacement of the reel by the manipulation of the member 80 is accomplished with optimum facility and in no more than a second of time.

The braking action is applied to the reel element by a two-armed lever 87 (FIGURES 1, 5 and 8) which extends through a diametrical groove in the bracket 36 and is pivoted at 88 for movement in either direction. In the reel of smaller size one arm 89 of the lever 87 preferably projects beyond the cage element 1 and carries a finger piece 90 by means of which the lever may be readily moved in either direction, and its second alining arm 91 overhangs the stud 40 of the shoe 37 and carries an adjustable screw 92 for engagement with the stud, the screw 92 being held in any position to which it may be adjusted by a lock screw 93. If the lever 87 be depressed, that is to say moved toward the cage wall 3, the pressure of the shoe 37 upon the floating disc 50 is relieved and the reel will run free. If the lever 87 be moved in the opposite direction, that is to say away from the cage wall 3, its screw 92, bearing upon the stud 40, will cause the shoe 37 to bear with pressure upon the floating disc 50, such braking pressure being as light or as heavy as may be desired.

The action of the lever 87 is preferably under the normal control of a leaf spring 94 having an end adjoining the inner face of the lever and attached to it as at 95 along the length of the arm 91. According to the invention the pressure with which the leaf spring acts upon the lever is controlled by a ring 96 mounted for rotatable adjustment upon the bracket 36, the ring being held by the bracket 36 in adjoining relation to the cage wall 3. The outer edge face of the ring 96 is formed with a cam surface 97 which extends in the clockwise direction through an arc of approximately 180°, its elevated end merging with the flat edge face of the ring. The spring 94 has a free end which rides upon the cam surface 97.

When the end of the spring 94 is at the deepest end of the cam surface 97 the pressure with which the spring acts upon the lever 87 is of minimum degree, being merely sufficient to cause the lever to apply a very light braking pressure to the disc 50. By rotating the ring 96 in the counter-clockwise direction the free end of the spring 94 in tracking upon the cam 97 will move from the deepest end of the cam toward its elevated end and the pressure with which the spring 94 acts upon the lever 87 will be correspondingly increased with the result that the braking pressure applied to the disc 50 will be correspondingly increased. When the free end of the spring is at the elevated end of the cam or when it tracks upon the flat edge face of the ring 96, the braking pressure is of maximum degree and is quite heavy. It will of course be understood that in any position of the ring 96, the lever 87 may be moved against the pressure of the spring 94 toward the cage wall 1, thereby to relieve the braking pressure to the extent that may be required under the particular circumstances, or conversely the lever 87 may be moved away from the cage wall 1, thereby to increase the braking pressure beyond the degree applied by the spring 94 in any particular position of the ring 96. In order that the ring 96 may be conveniently rotated its circumferential edge may be knurled and a portion of the ring 96, as shown in FIGURE 1, preferably projects beyond the peripheral edge of the wall 3. In order to prevent any accidental movement of the ring 96 the inner edge face of the ring is formed with a series of recesses 98 (FIGURES 6 and 7) which severally cooperate with a latch pin 99 fitted in a recess 100 in the head 12 of the reel mounting feature, the latch pin extending through openings in the plate 51 and the cage wall 3 with its end projecting beyond the face of the cage wall for engagement in any of the recesses 98. The engagement of the pin 99 in any of the recesses 98 is effected by a biasing spring 101 which is fitted in the recess 100. When the ring is turned in its positional adjustment its recesses 98 act camwise to displace the pin 99. When the ring 96 has been brought to the position which effects the desired regulation of the pressure of the spring 94, the pin 99 by engagement in an adjacent recess 98 will hold the ring against accidental movement.

The wall 14 of the reel element carries the usual laterally and outwardly projecting crank handle 102 by means of which the reel element may be rotated to pull in the line and wind it upon the reel.

The reel may be mounted above or underneath the rod, according to the particular type of rod and the particular kind of fishing which is being pursued. As used on rods constructed for fly casting the reel is mounted underneath the rod. As used on rods constructed for bait casting or for trolling the reel is mounted above the rod. In either case the fingerpiece 90 is readily accessible for finger or thumb pressure in the manipulation of the lever 87.

The drawings assume a reel for use by a right-handed individual. If used by a left-handed individual the bracket 36 is positioned whereby the lever 87 will extend in the opposite direction, that is to say, with reference to FIGURE 1, the lever will extend to the right instead of to the left. When the rod is for use by a left-handed individual the floating disc 50 will have the cam faces 53 and the channels 59 extended in the opposite directions from those shown in FIGURE 4, that is to say, the cam faces 53 will extend counter-clockwise and the channels 59 will extend clockwise.

Where large game fish are sought, as in deep sea fishing, the reel shown in FIGURES 16 and 17 is used, the rod being fitted in a socket carried by the belt worn by the angler.

The reel shown in FIGURES 16 and 17 incorporates the features above described and is provided with a suitable handle, preferably a bar 103 formed to provide a hand grip and having angularly directed terminal extensions 104 and 105 which are secured to the cage wall 3. The larger reel preferably has the form of brake applying lever shown in my Patent 2,553,784 and which has thumb pieces at its opposite ends. This form of reel is similar to the form shown in my patent in that it includes fastenings, here designated 106, for connecting the walls 13 and 14 of the reel element and for securing the terminal extensions 104 and 105. In other respects the reel shown in FIGURES 16 and 17 incorporates the features of the invention as above described and, as set forth in my said patent, may be converted from a reel for use by a left-handed individual merely by shifting the reel mounting feature to an appropriate position through an arc of 120°.

In both forms the plate 51 is a means so to confine the floating disk laterally that the braking pressure applied to the disk by the laterally movable brake shoe 37 is not transmitted to the reel element 2.

I claim:

1. In a fishing reel, in combination: a cage element having a wall, a reel element including connected walls spaced in parallel planes, one wall of the reel element being adjacent the wall of the cage element and the opposite wall of the reel element being provided with a laterally projecting crank handle, a central transverse arbor carried in fixed relation by the wall of the cage element and upon which the reel element is rotatably mounted, a floating disk adjoining the wall of the cage element and mounted concentrically with the arbor for rotation between the wall of the cage element and the adjacent wall of the reel element, a laterally movable brake shoe, the wall of the cage element having an opening to accommodate the brake shoe and the brake shoe confronting and adjoining the side of the floating disk opposite its side adjacent a wall of the reel element, means including cooperative elements carried by the floating disk and the reel element and operative when the reel element is rotated in a direction to pay out the line to cause the floating disk to rotate with the reel element and when the reel element is rotated in the opposite direction to wind the line to permit the floating disk to remain stationary, manually controlled means mounted upon and projecting laterally outward from the wall of the cage element for the application by means of the brake shoe of braking pressure laterally upon the floating disk or for the relief of such pressure during the rotation of the disk, and means supported by the cage element in a fixed relation of adjacency to that side of the floating disk opposite the side which is engageable by the brake shoe for so confining the floating disk against lateral movement under the braking pressure of the brake shoe that such pressure is not transmitted to the reel element.

2. A fishing reel as set forth in claim 1 wherein the means which causes the floating disk to rotate with the reel element in the line paying-out direction of its rotation consists of a hub portion provided upon the floating disk in concentric relation to the arbor and having inner and outer circumferential faces and a face extending between the circumferential faces which is formed with a series of arcuate cam faces, each terminating at a laterally directed shoulder, and a spring loaded pin is carried by the reel element which in the said direction of rotation of the reel element engages any one of the shoulders and thereby causes the rotation of the floating disk with the reel element, the pin riding idly over the cam faces when the reel element is rotated in the opposite direction with the floating disk free of the braking pressure of the brake shoe.

3. A fishing reel as set forth in claim 1 wherein the means for so confining the floating disk against lateral movement under the braking pressure of the brake shoe that such pressure is not transmitted to the reel element consists of a plate of substantially less area than the floating disk which plate is attached to the cage element in overlying relation to the floating disk and confines the floating disk in adjoining relation to the wall of the cage element.

4. A fishing reel as set forth in claim 1 having a click feature which comprises an annular series of upset channels formed on the floating disk and providing cam faces confronting the wall of the cage element and a pin carried by the wall of the cage element and movable laterally inward and outward and as moved inward having engagement with the cam faces, a loading spring acting upon the pin for effecting its inward movement, the pin in its engagement with the cam faces being moved by them laterally outward to ride along the surface of the floating disk during its rotation and upon coming into registry with each channel being snapped inward by its loading spring to strike the outer end of the adjacent cam face with a clicking noise.

5. A fishing reel as set forth in claim 4 wherein the click feature includes manually actuated means for moving the pin to an inoperative position and means associated with the manually actuated means and operative to hold the pin in its inoperative position or to release the pin for the discharge of its click function.

6. A fishing reel as set forth in claim 1 wherein the manually controlled means for the application or relief of the braking pressure includes a bracket attached to the wall of the cage element, a two-armed lever pivotally connected to the bracket with one of its arms positioned for operative engagement with the brake shoe, a leaf spring having one end attached to the lever at one side of its pivot and the other end free, and a positionally adjustable ring rotatably mounted upon the bracket, adjoining the wall of the cage element, and having an annular flat face formed with an arcuate cam surface extending through approximately 180°, the free end of the leaf spring being positioned for bearing engagement upon the edge face of the ring which is provided with the cam surface.

7. A fishing reel as set forth in claim 6 wherein the ring has a series of recesses in its annular edge face at the side thereof opposite to the edge face which is formed with the cam surface, a part is connected to the wall of the cage element which is formed with a laterally extending recess, a latch pin is mounted in the laterally extending recess for lateral movement and is engageable with the recesses of the ring, and a spring is mounted in the laterally extending recess for moving the latch pin into engagement with a recess of the ring, the recesses of the ring in the rotatable positional adjustment of the ring operating cam-wise to displace the latch pin against the pressure of its spring and the latch pin by its engagement in any of the recesses holding the ring against accidental displacement from a particular position.

8. A fishing reel as set forth in claim 6 wherein one of the arms of the lever projects beyond the wall of the cage and provides a fingerpiece and the leaf spring is attached to the other arm of the lever.

9. A fishing reel as set forth in claim 7 wherein the part in which the laterally extending recess is formed is a reel mounting element.

10. A fishing reel as set forth in claim 3 wherein the brake shoe is located within the area bounded by the edges of the plate and in the application of braking pressure such shoe and the plate bear upon the opposite sides of the floating disk in coincident areas.

11. A fishing reel as set forth in claim 2 having a click feature which comprises an annular series of upset channels formed on the floating disk and providing arcuate cams faces confronting the wall of the cage element and concentric as a series to the cam faces first named and which extend in directions opposite to the directions of extent of the cam faces first named, a pin carried by the wall of the cage element and movable laterally inward and outward and as moved inward having engagement with the cam faces provided by the upset channels, a loading spring acting upon the pin last named for effecting its inward movement, the pin last named in its engagement with the cam faces provided by the upset channel being moved by them laterally outward to ride along the surface of the floating disk upon its rotation and upon coming into registry with each channel being snapped inward by its loading spring to strike the outer end of the adjacent cam faces with a clicking noise.

12. In a fishing reel, in combination: a cage element having a wall, a reel element including walls spaced in parallel planes and a centrally located sleeve carried by and connecting the walls of the reel element, one wall of the reel element being adjacent the wall of the cage element and the opposite wall of the reel element being provided with a laterally projecting crank handle, a central transverse arbor carried in fixed relation by the wall of the cage element, a centrally located boss carried by the wall of the cage element and concentric to the arbor, ball bearings fitted upon the arbor and upon which the sleeve is mounted, a collar upon the arbor, one of the ball bearings being arranged between the boss on the cage wall and the collar, a floating disk adjoining the wall of the cage element and arranged between it and the adjacent wall of the reel element, the floating disk being rotatably mounted upon the boss on the cage wall, a laterally movable brake shoe, the wall of the cage element having an opening to accommodate the brake shoe and the brake shoe confronting and adjoining the side of the floating disk opposite its side adjacent a wall of the reel element, means including cooperative elements carried by the floating disk and the reel element and operative when the reel element is rotated in a direction to pay out the line to cause the floating disk to rotate with the reel element and when the reel element is rotated in the opposite direction to wind the line to permit the floating disk to remain stationary, and manually controlled means mounted upon and projecting laterally outward from the wall of the cage element for the application by means of the brake shoe of braking pressure laterally upon the floating disk or for the relief of such pressure during the rotation of the disk.

13. A fishing reel set forth in claim 12 wherein the collar upon the arbor is in the form of a nut and the arbor has threads for engagement by the collar.

14. In a fishing reel, in combination: a cage element having a wall, a reel element including connected walls spaced in parallel planes, one wall of the reel element being adjacent the wall of the cage element and the opposite wall of the reel element being provided with a laterally projecting crank handle, a central transverse arbor carried in fixed relation by the wall of the cage element and upon which the reel element is rotatably mounted, a floating disk adjoining the wall of the cage element and mounted concentrically with the arbor for rotation between the wall of the cage element and the adjacent wall of the reel element, a laterally movable brake shoe, the wall of the cage element having an opening to accommodate the brake shoe and the brake shoe confronting and adjoining the side of the floating disk opposite its side adjacent a wall of the reel element, means including cooperative elements carried by the floating disk and the reel element and operative when the reel element is rotated in a direction to pay out the line to cause the floating disk to rotate with the reel element and when the reel element is rotated in the opposite direction to wind the line to permit the floating disk to remain stationary, manually controlled means mounted upon and projecting laterally outward from the wall of the cage element for the application by means of the brake shoe of braking pressure laterally upon the floating disk or for the relief of such pressure during the rotation of the disk, a retaining element for the floating disk which retaining element is positioned between the floating disk and the adjacent wall of the reel element and fastenings for holding the retaining element in fixed relation to the floating disk.

References Cited in the file of this patent

UNITED STATES PATENTS

| 1,005,154 | Cattucci | Oct. 10, 1911 |
| 1,995,221 | Peel et al. | Mar. 19, 1935 |
| 2,059,765 | Adams | Nov. 3, 1936 |
| 2,180,566 | Thompson | Nov. 21, 1939 |
| 2,306,258 | Kreis | Dec. 22, 1942 |
| 2,433,537 | Ward | Dec. 30, 1947 |
| 2,448,610 | Mandolf | Sept. 7, 1948 |
| 2,553,784 | Parks | May 22, 1951 |
| 2,566,344 | Lord | Sept. 4, 1951 |
| 2,686,016 | Kilian | Aug. 10, 1954 |
| 2,713,463 | Sarah | July 19, 1955 |
| 2,859,924 | Sarah | Nov. 11, 1958 |
| 2,865,662 | Nurmse | Dec. 23, 1958 |

FOREIGN PATENTS

| 86,984 | Sweden | July 28, 1936 |
| 658,472 | Great Britain | Oct. 10, 1951 |